Dec. 6, 1949     D. T. DE V. BRAND     2,490,014
TRAILER FOR MOTOR VEHICLES
Filed March 7, 1947
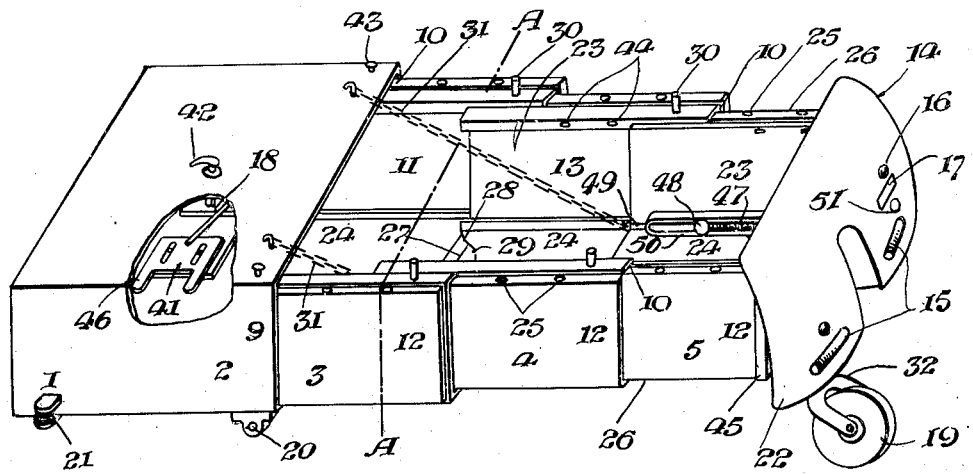
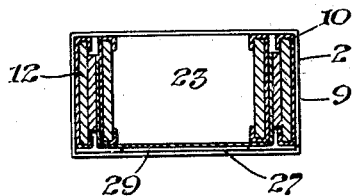
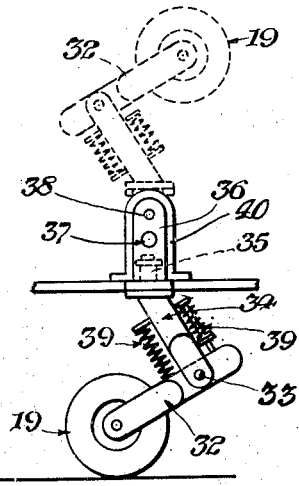
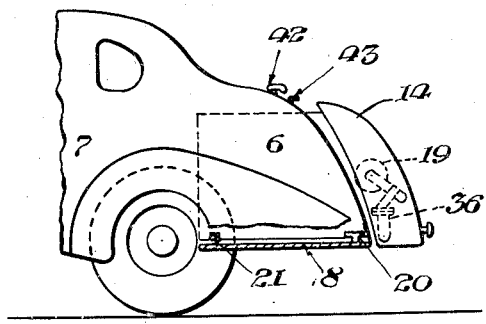
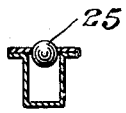
INVENTOR.
DANIEL T. de V. BRAND
BY Francis E. Boyce
ATTORNEY Patented Dec. 6, 1949

2,490,014

UNITED STATES PATENT OFFICE 2,490,014

TRAILER FOR MOTOR VEHICLES

Daniel Tobias de Villiers Brand, Johannesburg, Transvaal, Union of South Africa

Application March 7, 1947, Serial No. 733,087
In the Union of South Africa January 14, 1947

1 Claim. (Cl. 296—26)

This invention relates to trailers adapted to be directly secured to the back of motor vehicles.

The object of this invention is to provide a trailer, adjustable in length and variable in capacity, and which is formed by an extension of the back of a motor vehicle.

A further object is to support the rear end of the trailer by a spring mounted castor wheel.

A still further object is to provide means for firmly securing the trailer without excessive rattle in any suitably extended or closed position.

A preferred form of the invention is shown in the accompanying drawings in which:

Fig. I is a perspective view of the trailer partly in section.

Fig. II is a smaller view of part of a motor car with the trailer stowed in the rear portion.

Fig. III is a section on A—A Fig. I and,

Figs. IV and V are details.

The body 1 of the trailer consists of a number of sections 2, 3, 4, 5, approximately equal in length and graded in width to telescope into each other.

The first section 2 is usually of box-like form adapted to fit into the luggage box 6, modified if necessary, of a motor car 7 and is secured to the floor 8 thereof. Its sides 9 are channel shaped at 10 in section to allow the side 11 of the next section 3 to slide therein. The sides 11 of the intermediate section 3 not only have the channels 10 but rigid side members 12 to slide in the channels 10 of the preceding section. The last section 5 has rigid side members 12 adapted to slide in the channels 10 in the sides 13 of the preceding section 4. It also has an end plate 14 to which may be secured a divided bumper 15, tail light 16 and number plate 17.

Suitably positioned locking means 18 are provided to hold the telescoping parts of the trailer 1 in a closed or in any desired extended position. There is also a retractable castor wheel 19 positioned on the rear end plate 14 of the last section 5. The castor wheel 19 supports the trailer 1 when it is sufficiently extended to require such support.

The front box-like section 2 may be rigidly secured to the floor 8 of the luggage box 6 suitably reinforced for this purpose. Alternatively said section 2 may be mounted on a hinge 20 on the floor 8 at the rear of the luggage box 6 and when the trailer 1 is extended it is held horizontal as a cantilever by the pressure of springs 21 so as to allow for vertical movement of the end 22 of the trailer 1 if excessively uneven surfaces are encountered in travelling.

As stated above the first section 2 is box-like.

The intermediate and rear sections 3, 4, 5, are in the form of open topped troughs 23 with flat floors 24. The vertical sides of the troughs each consist of a narrow girder-like structure 12 carrying spring mounted anti-friction bearings 25 on its top and bottom surfaces 26. These narrow girder-like structures 12 are made a sliding fit in channels 10 formed in the sides of the preceding trough.

Stops 27 are provided to limit the outward sliding movement of the different troughs 23 and are so positioned that there is a sufficient length of the girders 12 left in the channels 10 to provide a good bearing surface. These stops 27 are preferably in the form of transverse strips 28, 29 secured to the floors 24 of the different troughs such that when the trailer is fully extended a strip 28 on the bottom surface of the floor 24 of each trough butts against a corresponding strip 29 on the top surface of the floor 24 of the trough immediately preceding it.

The trough or troughs when pulled out are secured against inward movement by any suitable means. For example pins 30 may be passed into the channel 10 and may extend into sockets in the girder-like sides 12 above described. The troughs are braced in such position by means of stays which may take the form of two chains 31 or cables connecting the rear of trough 5 to the top of the luggage box 6; tensioning of the chains 31 tends to collapse the telescoping parts, the pins 30 however, prevent such movement and the structure is thereby securely braced. The chains 31 may be tensioned by any suitable device such as a turnbuckle or a screw threaded spindle 47 working in a fixed nut. In the latter case as indicated in Fig. I the end of the spindle 47 has a collar 48 rotatably secured to it. The collar 48 is connected to a suitable hook 49 to engage the chain 31 and is adapted to move in guides 50 secured to the floor 24 of the end trough 5. The end plate 14 has an aperture 51 to enable a suitable cranked handle to be inserted therein to rotate the spindle 47.

The castor wheel 19 providing a support for the rear end of the trailer 1 is positioned in or on the rear plate 14 of the rear trough 5. Said wheel 19 will normally only be required when the trailer 1 is extended beyond a certain length and it is conveniently made retractable. This may be done by mounting the wheel 19 in fork 32 the shank of which is pivoted between the prongs 33 of a second fork 34. Fork 34 terminates in a vertical swivel joint 35 at the end of a pillar 36 adapted to turn transverse to its length on a pin 37 when the locking pin 38 releases it. Springs 39 allow the wheel 19 to carry its load resiliently. The whole mechanism for wheel 19 is carried by a suitable bracket 40 secured to the rear trough 5. When wheel 19 is to be retracted pin 38 is released and the wheel can be swung up to the position shown by dotted lines in Fig. IV.

An extensible locking plate 41 is secured within the box-like section 2 in which the nested trailer 1 is carried. A handle 42 which may be locked against unwarranted use, operates the locking plate 41 to extend it transversely of the trailer 1 when it is made to lock the unwithdrawn troughs in the box-like compartment 2, by means of the outwardly projecting tongues 46 which engage the slots 44 in the sides of the troughs 3, 4 or 5. In addition suitable set screws 43 may project above the compartment, the operation of which serves to clamp down on the top edges 26 of the trailer sections 3, 4, 5, to lock them against rattle.

When the trailer 1 is required for use the handle 42 operating the extensible locking plate 41 holding the troughs in their closed position, is turned and the trailer 1 pulled out to the desired extent. The castor wheel 19 may now be lowered and the locking pin 38 fitted in position. The chains 31 or cables are then placed in position and tensioned. It will be understood that in addition to bracing the structure the chains 31 also serve to support, to some extent, the rear end of the trailer 1. The extensible locking plate 41 above mentioned is operated to lock the troughs, not withdrawn, in position in the box-like section and openings 44 are provided for this purpose.

When the trailer is no longer required, the tension on the chains or cables 31 is released, the pins 30 removed and the rear troughs 3, 4, 5, pushed inwards. A stop 45 projecting on each side of the rear trough 5 bears against the ends of each preceding trough so that the latter are telescoped in turn. When the troughs are all nested into the box-like first section 2 the extensible locking plate 41 is used to lock the last trough 5 by means of slots 44 and therefore the whole telescoped trailer 1 in place. Finally the castor wheel 19 is retracted after the removal of the locking pin 38.

The number of troughs provided will depend on the requirements. The troughs may be constructed of any suitable material but are preferably made of light metal such as aluminium or an aluminium alloy.

The trailer as described is normally attached to a motor car and may be streamlined when closed into the body of the car. It may also be used to extend the body of a motor van.

This invention provides a trailer adapted to be nested into the back of a motor vehicle or extended for use to the length desired.

What I claim as new and desire to secure by Letters Patent is:

A trailer for a road motor vehicle having a rearwardly opening storage compartment comprising in series and overlapping relation to each other, a box like structure to fit in said compartment, one or more intermediate troughs and an end trough, inwardly extending channels on the inner vertical sides of the box and intermediate troughs, rigid side members secured along the outer horizontal sides of the intermediate troughs and the end trough, said side members slidably engaging the channels on the trough or box immediately preceding them, stops limiting the outward movement of the troughs, a closure plate for the storage compartment mounted on and closing the final trough and means for supporting the rear end of the trailer comprising a retractable spring mounted castering road wheel mounted at the rear of the final trough.

DANIEL TOBIAS DE VILLIERS BRAND.

REFERENCES CITED

The following references are of record in the file of this patent:

UNITED STATES PATENTS

| Number | Name | Date |
| --- | --- | --- |
| 1,366,771 | Devencenzi | Jan. 25, 1921 |
| 1,452,394 | Simon | Apr. 17, 1923 |
| 1,467,195 | Quackenbush | Sept. 4, 1923 |
| 1,588,740 | Johnson | June 15, 1926 |
| 1,629,403 | Marwahn | May 17, 1927 |
| 2,254,437 | Marney | Sept. 2, 1941 |
| 2,328,138 | Gosser | Aug. 31, 1943 |

FOREIGN PATENTS

| Number | Country | Date |
| --- | --- | --- |
| 19,811 | Australia | May 1, 1930 |